(12) United States Patent
Collins

(10) Patent No.: US 8,684,437 B1
(45) Date of Patent: Apr. 1, 2014

(54) PORTABLE MOBILE RECYCLING CENTER

(76) Inventor: Jeff L. Collins, Greeneville, TN (US)

( * ) Notice: Subject to any disclaimer, the term of this patent is extended or adjusted under 35 U.S.C. 154(b) by 179 days.

(21) Appl. No.: 13/081,374

(22) Filed: Apr. 6, 2011

(51) Int. Cl.
*B60P 3/00* (2006.01)

(52) U.S. Cl.
USPC .................. 296/24.3; 296/183.2; 414/482

(58) Field of Classification Search
USPC ............. 52/69, 68; 296/24.3, 24.32, 24.39, 296/24.38, 183.1, 183.2; 414/21, 482, 483, 414/486, 487, 494, 500
See application file for complete search history.

(56) References Cited

U.S. PATENT DOCUMENTS

| | | | | |
|---|---|---|---|---|
| 2,577,836 A * | 12/1951 | Willson | ...................... | 296/156 |
| 2,817,846 A * | 12/1957 | Stift | ...................... | 4/664 |
| 2,857,062 A * | 10/1958 | Anderson | ...................... | 414/543 |
| 2,953,408 A * | 9/1960 | Koenig | ...................... | 296/183.2 |
| 3,784,035 A * | 1/1974 | Dunbar | ...................... | 414/543 |
| 4,012,069 A * | 3/1977 | Carson | ...................... | 294/68.23 |
| 4,230,360 A * | 10/1980 | Eisenman | ...................... | 296/183.1 |
| 4,643,476 A * | 2/1987 | Montgerard | ...................... | 296/24.32 |
| 4,674,942 A * | 6/1987 | Assh et al. | ...................... | 414/483 |
| 4,690,609 A * | 9/1987 | Brown | ...................... | 414/543 |
| 4,840,531 A * | 6/1989 | Dinneen | ...................... | 414/409 |
| 4,934,898 A * | 6/1990 | Galbreath | ...................... | 414/812 |
| 4,951,999 A * | 8/1990 | Rudolph et al. | ...................... | 298/11 |
| 4,954,039 A * | 9/1990 | Johnston et al. | ...................... | 414/500 |
| 5,058,957 A * | 10/1991 | Fell | ...................... | 298/24 |
| 5,078,567 A * | 1/1992 | Lombardo | ...................... | 414/525.6 |
| 5,122,025 A * | 6/1992 | Glomski | ...................... | 414/486 |
| 5,197,774 A * | 3/1993 | Diaz | ...................... | 296/24.39 |
| 5,209,361 A * | 5/1993 | Grubb, Jr. | ...................... | 212/283 |
| 5,375,899 A * | 12/1994 | Wright | ...................... | 296/21 |
| 5,387,071 A * | 2/1995 | Pinkston | ...................... | 414/563 |
| 5,398,463 A * | 3/1995 | Wright | ...................... | 52/7 |
| 5,419,502 A * | 5/1995 | Morey | ...................... | 241/101.761 |
| 5,460,473 A * | 10/1995 | LaMora et al. | ...................... | 414/494 |
| 5,493,817 A * | 2/1996 | Speer | ...................... | 52/69 |
| 5,775,867 A * | 7/1998 | Christenson | ...................... | 414/408 |
| 5,833,294 A * | 11/1998 | Williams et al. | ...................... | 296/24.32 |
| 5,846,044 A * | 12/1998 | Smith et al. | ...................... | 414/408 |
| 5,897,158 A * | 4/1999 | Henke et al. | ...................... | 296/24.3 |
| 5,919,027 A * | 7/1999 | Christenson | ...................... | 414/408 |
| 6,012,895 A * | 1/2000 | Smith et al. | ...................... | 414/810 |
| 6,213,706 B1 * | 4/2001 | Christenson | ...................... | 414/408 |
| 6,336,683 B1 * | 1/2002 | Akiba | ...................... | 298/8 T |
| 6,354,787 B1 * | 3/2002 | O'Daniel | ...................... | 414/494 |
| 6,368,047 B1 * | 4/2002 | White | ...................... | 414/555 |
| 6,382,731 B1 * | 5/2002 | Slutz et al. | ...................... | 298/22 R |
| 6,497,442 B1 * | 12/2002 | Wacker | ...................... | 296/24.32 |
| 6,655,904 B2 * | 12/2003 | Landoll et al. | ...................... | 414/812 |
| 6,695,390 B2 * | 2/2004 | Bucco Morello | ...................... | 296/186.4 |
| 6,783,164 B2 * | 8/2004 | Bortell | ...................... | 296/24.33 |
| 6,877,581 B2 * | 4/2005 | Badr et al. | ...................... | 180/311 |
| 6,896,316 B1 * | 5/2005 | Taylor | ...................... | 296/182.1 |
| 6,902,226 B1 * | 6/2005 | Taylor | ...................... | 296/182.1 |
| 6,969,102 B2 * | 11/2005 | Orischak et al. | ...................... | 296/24.32 |
| 7,021,699 B2 * | 4/2006 | Crean | ...................... | 296/164 |

(Continued)

*Primary Examiner* — Joshua J Michener
*Assistant Examiner* — James Ference
(74) *Attorney, Agent, or Firm* — Michael I. Kroll

(57) ABSTRACT

A portable mobile recycling center having a drop deck semi-trailer with an enclosed storefront section for office and storage with a bulk recycling section comprising an articulated boom mounted thereto providing means for handling and weighing recyclables and a roll-off recyclables receptacle at the rear of the trailer providing for bulk storage of recyclables. The mobile unit provides recycling opportunities for residential areas that have no means of recycling their large and small unwanted materials.

9 Claims, 9 Drawing Sheets

(56) References Cited

U.S. PATENT DOCUMENTS

Figure 1:
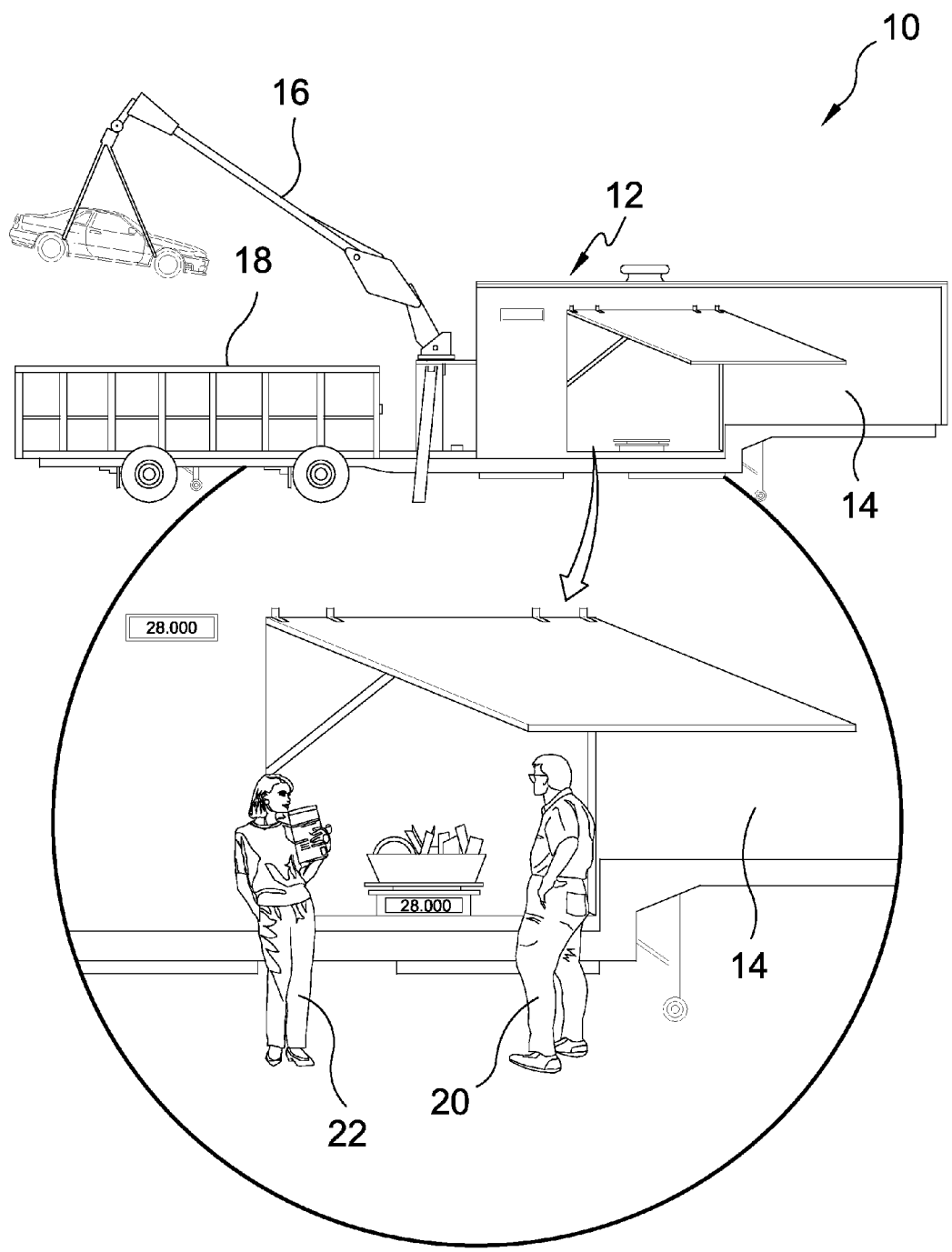

| | | | |
|---|---|---|---|
| 7,082,685 B2 * | 8/2006 | Crean | 29/897.2 |
| 7,114,754 B2 * | 10/2006 | Morello | 296/24.32 |
| 7,290,817 B1 * | 11/2007 | Delasse et al. | 296/24.32 |
| 7,866,934 B2 * | 1/2011 | Osburn et al. | 414/494 |
| 8,079,799 B2 * | 12/2011 | Rathbun et al. | 414/626 |
| 2002/0140243 A1 * | 10/2002 | Alemagna | 296/24.1 |
| 2003/0115808 A1 * | 6/2003 | Morrow | 52/64 |
| 2004/0140683 A1 * | 7/2004 | Orischak et al. | 296/24.32 |
| 2004/0201249 A1 * | 10/2004 | Bush, Sr. | 296/183.1 |
| 2004/0238230 A1 * | 12/2004 | Petrotto | 177/144 |
| 2005/0127713 A1 * | 6/2005 | Taylor | 296/182.1 |
| 2005/0127714 A1 * | 6/2005 | Taylor | 296/182.1 |
| 2005/0179276 A1 * | 8/2005 | Morello | 296/24.32 |
| 2005/0232736 A1 * | 10/2005 | Fellows et al. | 414/487 |
| 2006/0045661 A1 * | 3/2006 | Andersson | 414/140.3 |
| 2006/0285952 A1 * | 12/2006 | Galbreath et al. | 414/457 |
| 2007/0182182 A1 * | 8/2007 | Hall | 296/24.32 |
| 2009/0001741 A1 * | 1/2009 | Heuvelman | 296/24.32 |
| 2009/0121509 A1 * | 5/2009 | Coy et al. | 296/24.32 |
| 2009/0127361 A1 * | 5/2009 | Kelly et al. | 241/27 |
| 2009/0132407 A1 * | 5/2009 | Romary | 705/35 |
| 2009/0205877 A1 * | 8/2009 | Claypool | 177/239 |
| 2009/0243369 A1 * | 10/2009 | Fick | 298/8 H |
| 2009/0245989 A1 * | 10/2009 | Mickelson | 414/487 |
| 2010/0215466 A1 * | 8/2010 | Cline | 414/495 |
| 2010/0266374 A1 * | 10/2010 | Haub et al. | 414/300 |

* cited by examiner

PORTABLE MOBILE RECYCLING CENTER

BACKGROUND OF THE INVENTION

1. Field of the Invention

The present invention relates generally to land vehicles and, more specifically, to a portable mobile recycling center having a drop deck semi trailer with an enclosed store front section for recyclable transaction processing renumerating participants for said recyclables. An articulated boom releasable attached to said drop deck semi trailer aids in weighing recyclables for said participant renumeration and a roll-off recyclables storage receptacle that can be swapped out with another receptacle as desired.

The mobile unit provides recycling opportunities for residential areas that have no means of recycling their large and small unwanted materials.

2. Description of the Prior Art

There are other mobile devices designed for pickup and storage of recyclables. While these devices may be suitable for the purposes for which they where designed, they would not be as suitable for the purposes of the present invention as heretofore described.

It is thus desirable to provide a mobile recycling center wherein users can recycle items for remuneration approximate curbside.

It is further desirable to provide a mobile recycling center comprising a trailer having a store front portion and a recyclables receptacle portion having a an articulated boom therebetween for weighing and depositing recyclables within said receptacle portion.

SUMMARY OF THE PRESENT INVENTION

A primary object of the present invention is to provide a mobile recycling center comprising a towable multipurpose trailer.

Another object of the present invention is to provide a mobile recycling center wherein said multipurpose trailer has a fixedly attached storefront portion and a selectively movable and replaceable recyclables receptacle.

Yet another object of the present invention is to provide a mobile recycling center wherein said multipurpose trailer forms a wheeled rigid support structure for said storefront and said replaceable recyclable receptacle.

Still yet another object of the present invention is to provide a mobile recycling center wherein said multipurpose trailer may incorporate rollers or other apparatus forming an integral part therewith for facilitating movement of the recyclables receptacle onto and off of said rigid support structure as desired.

A further object of the present invention is to provide a mobile recycling center wherein said recyclable receptacle provides bulk recyclables storage means and facilitates bulk portage through the swappable recyclables receptacle.

A yet further object of the present invention is to provide a mobile recycling center further providing an articulated boom for depositing heavy recyclables from the ground into said storage bin.

A still yet further object of the present invention is to provide a mobile recycling center wherein said articulated boom has a pair of extendable retractable outriggers for stabilizing said articulated boom during lifting.

An additional object of the present invention is to provide a mobile recycling center wherein said articulated boom provides for an attachable detachable bucket facilitating bulk collection and storage of a plurality of recyclables for deposit within said recyclables receptacle.

Another object of the present invention is to provide a mobile recycling center wherein said articulated boom further incorporates weight measuring apparatus and weight display means for valuating the recyclables held thereby.

Yet another object of the present invention is to provide a mobile recycling center wherein said articulate booms and components thereof are powered either pneumatically or electrically or a combination of both.

Still yet another object of the present invention is to provide a mobile recycling center wherein said storefront incorporates environmental controls and sanitation facilities therein.

A further object of the present invention is to provide a mobile recycling center wherein said storefront further incorporates a plurality of compartments for segregating recyclables.

A yet further object of the present invention is to provide a mobile recycling center wherein said storefront further provides container means for processing a plurality of recyclables.

A still yet further object of the present invention is to provide a mobile recycling center wherein said storefront incorporates a deployable side wall portion forming canopy and receiving center for weighing and processing recyclables.

Additional objects of the present invention will appear as the description proceeds.

The present invention overcomes the shortcomings of the prior art by providing a portable mobile recycling center having a drop deck semi trailer with an enclosed storefront section for office and storage with a bulk recycling section comprising an articulated boom mounted to the trailer providing means for handling and weighing recyclables and a roll-off recyclables receptacle at the rear of the trailer providing for bulk storage of recyclables. The mobile unit provides recycling opportunities for residential areas that have no means of recycling their large and small unwanted materials.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Figure 2:
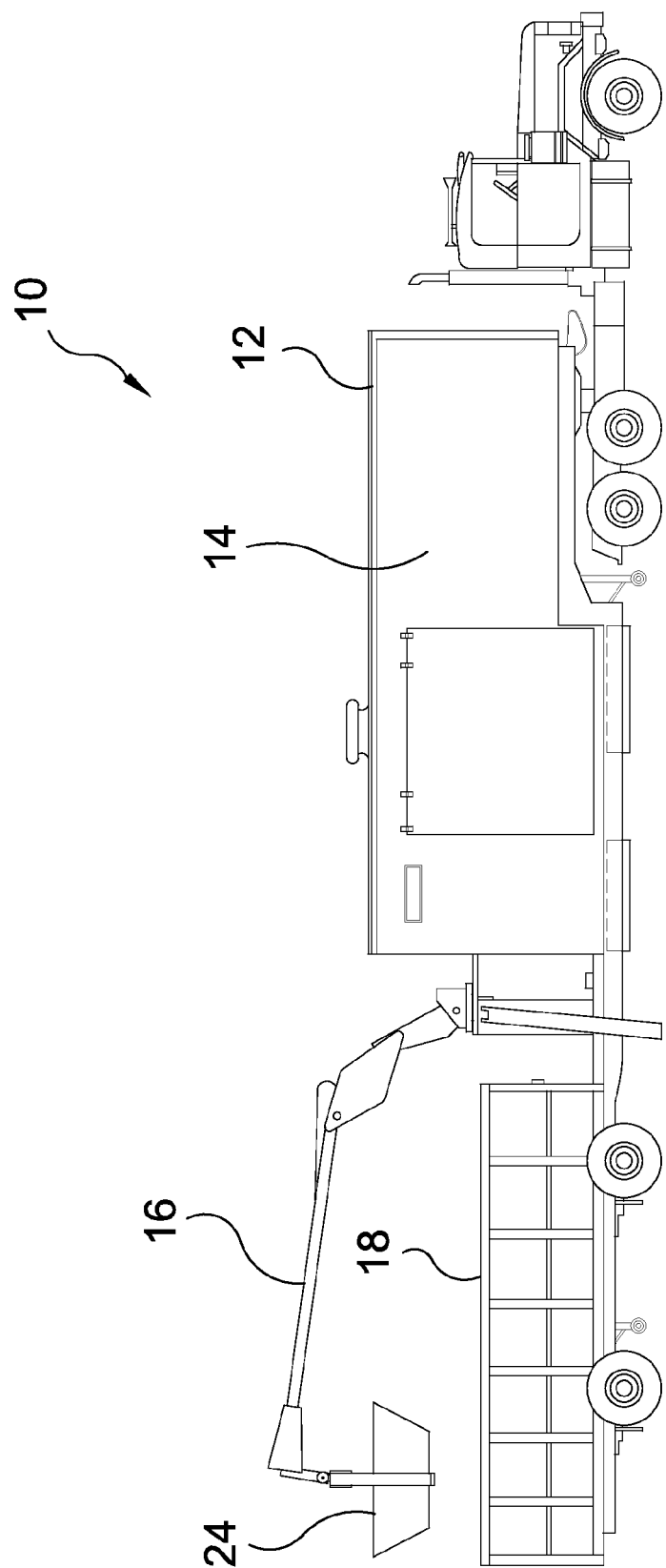
Figure 3:
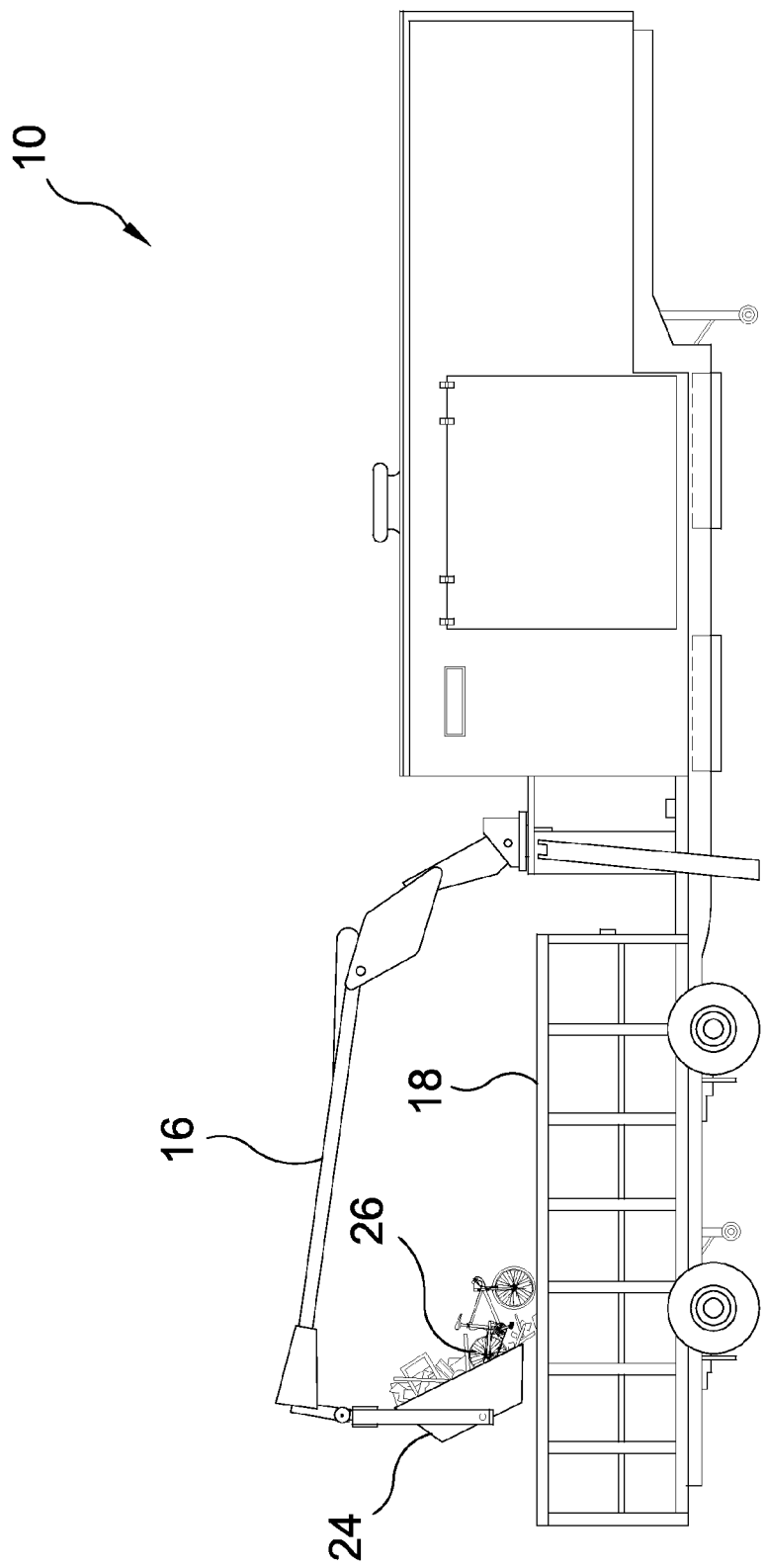
Figure 4:
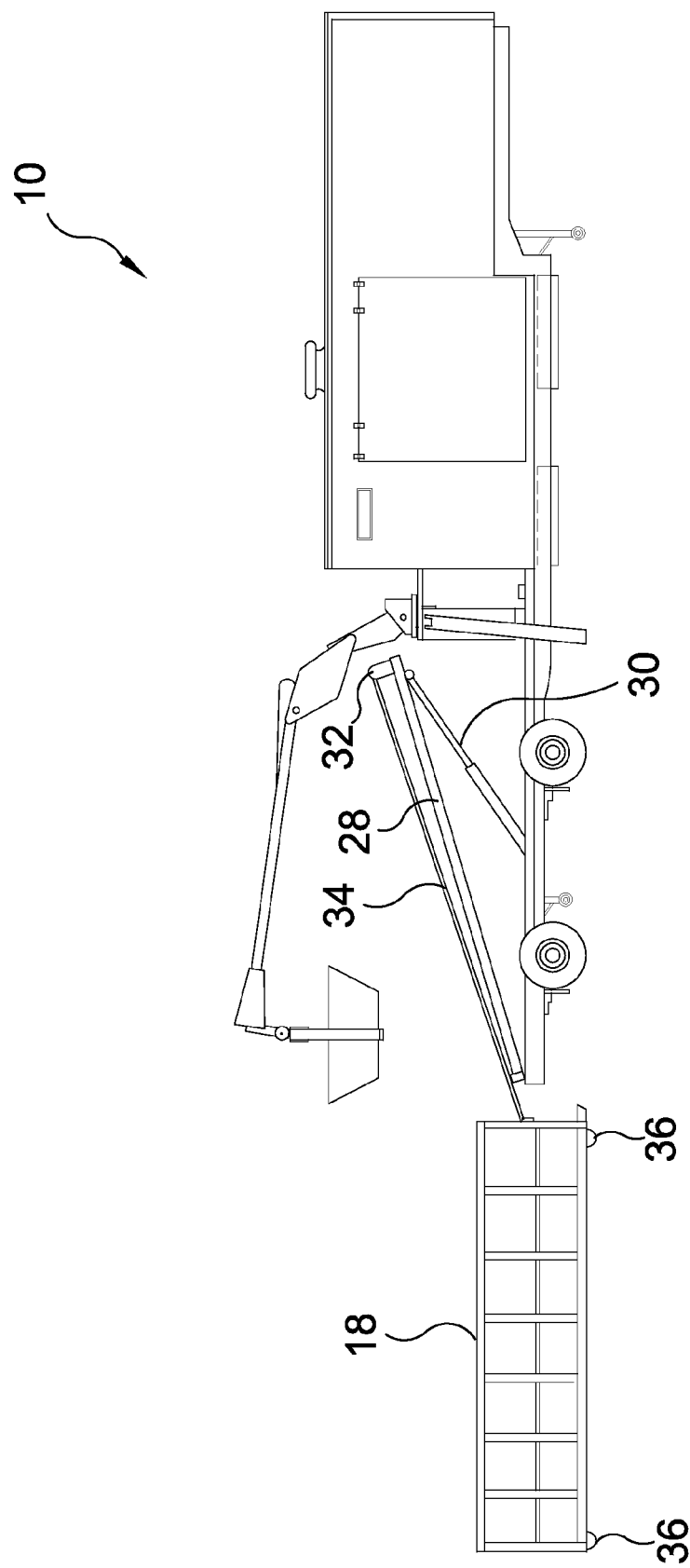
Figure 5:
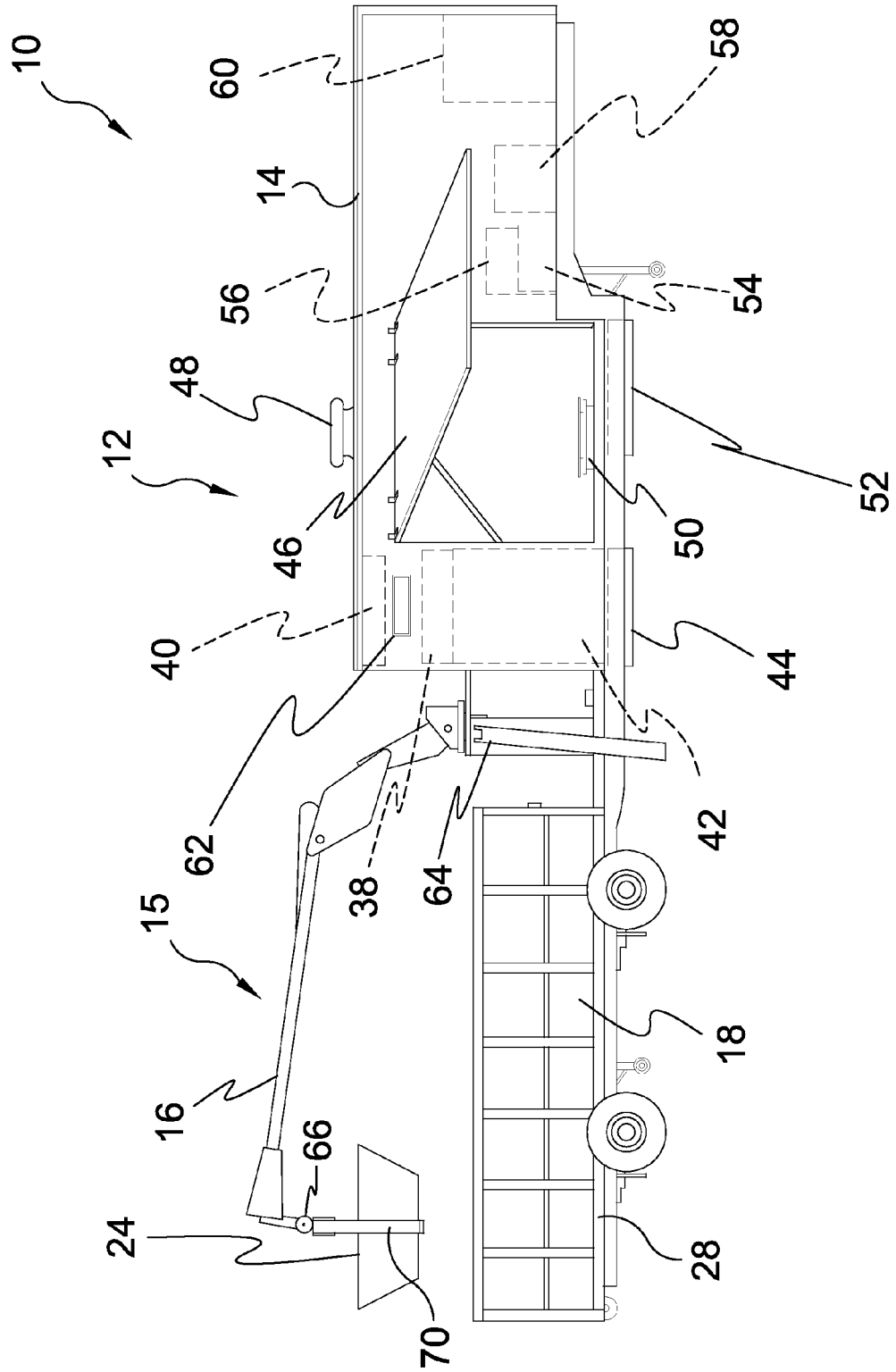
Figure 6:
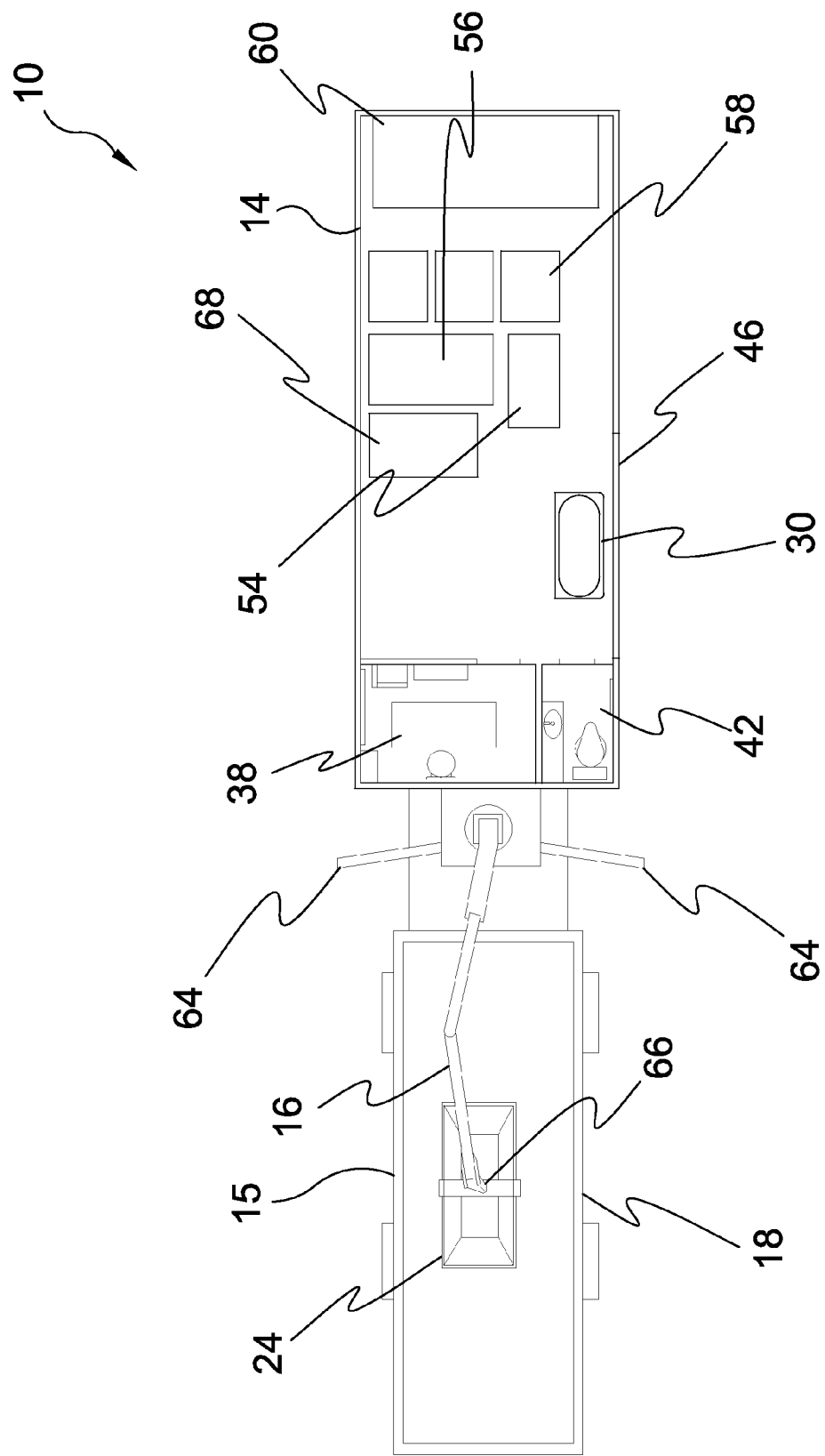
Figure 7:
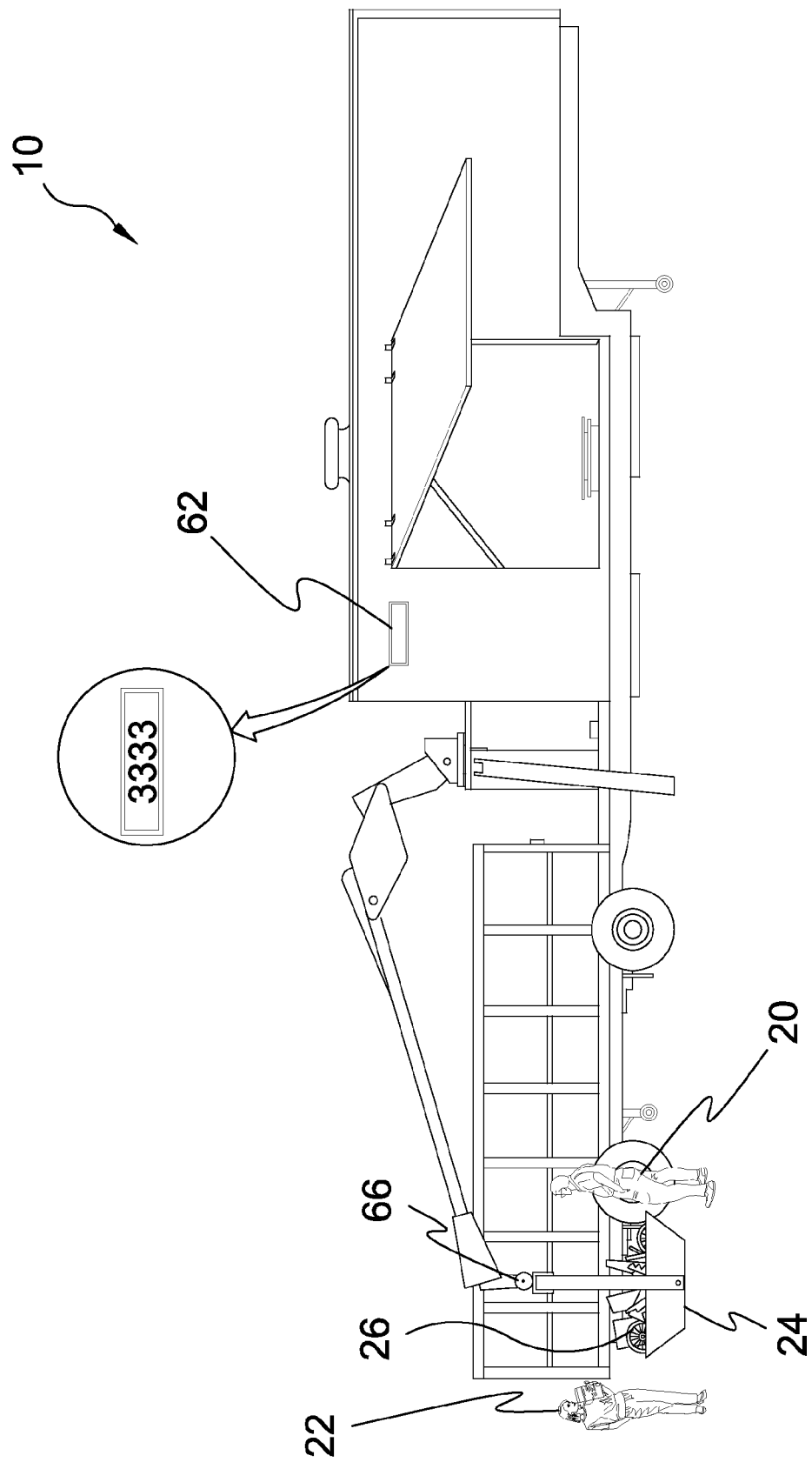
Figure 8:
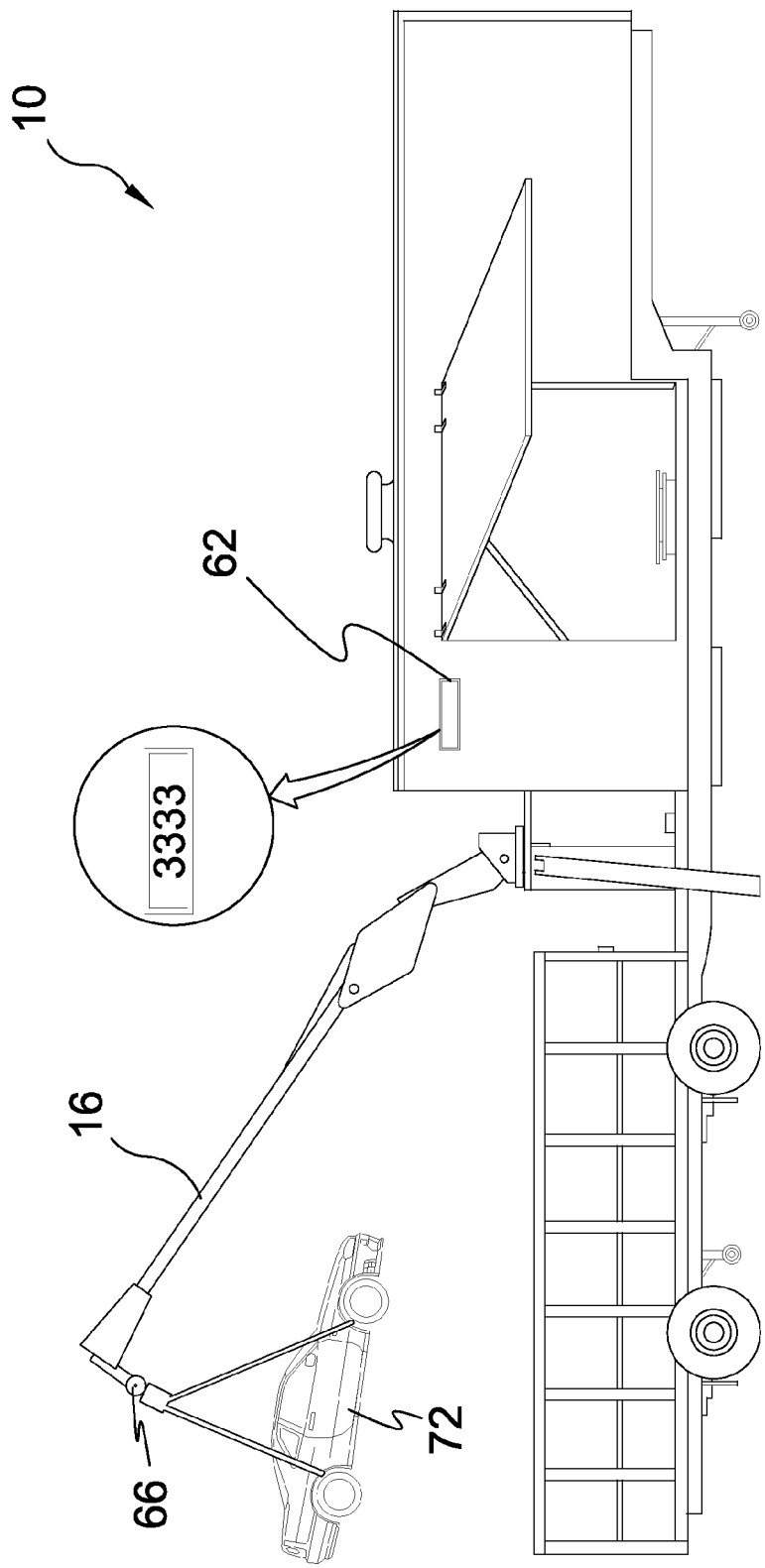
Figure 9:
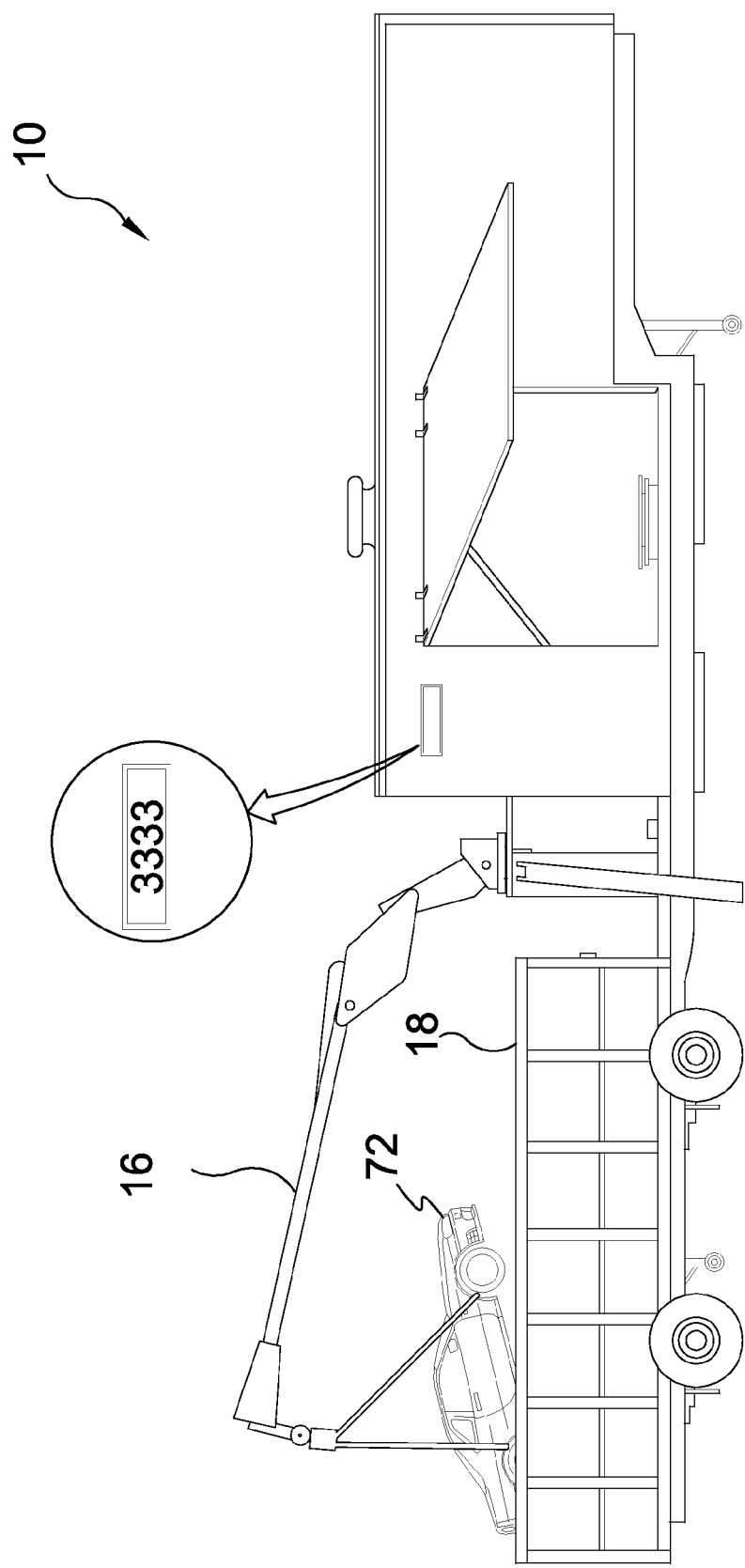

In order that the invention may be more fully understood, it will now be described, by way of example, with reference to the accompanying drawing in which:

FIG. 1 is an illustrative view of the present invention in use.
FIG. 2 is a side view of the present invention.
FIG. 3 is a side view of the present invention.
FIG. 4 is a side view of the present invention.
FIG. 5 is a side view of the present invention.
FIG. 6 is a top view of the present invention.
FIG. 7 is a side view of the present invention.
FIG. 8 is a side view of the present invention.
FIG. 9 is a side view of the present invention.

DESCRIPTION OF THE REFERENCED NUMERALS

Turning now descriptively to the drawings, in which similar reference characters denote similar elements throughout the several views, the figures illustrate the Portable Mobile Recycling Center of the present invention. With regard to the reference numerals used, the following numbering is used throughout the various drawing figures.

| | |
|---|---|
| 10 | Portable Mobile Recycling Center of the present invention |
| 12 | drop deck semi-trailer |
| 14 | enclosed storefront section |
| 15 | bulk loading section |
| 16 | articulated boom arm |
| 18 | roll-off container |
| 20 | operator |
| 22 | customer |
| 24 | grapple bin |
| 26 | recyclables |
| 28 | lift platform |
| 30 | hydraulic piston |
| 32 | winch |
| 34 | cable |
| 36 | wheel of 18 |
| 38 | small office |
| 40 | fresh water tank |
| 42 | bathroom |
| 44 | waste water tank |
| 46 | lift-up door |
| 48 | air/heat vent |
| 50 | scale |
| 52 | waste oil collection tank |
| 54 | aluminum can flattener |
| 56 | baler |
| 58 | storage bin |
| 60 | generator hydraulic power unit |
| 62 | remote weight display |
| 64 | outrigger |
| 66 | boom scale |
| 68 | paper shredder |
| 70 | suspension support |
| 72 | junk vehicle |

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention in use. The present invention is a portable mobile recycling center 10 having a drop deck semi trailer 12 with an enclosed storefront section 14 for office and segregated recyclables storage compartments. An articulated boom 16 attached to the drop deck semi trailer 12 aids in lifting and weighing and depositing recyclables in a removable roll-off container 18 on the rear of the trailer. The mobile unit provides recycling opportunities for residential areas that have no means of recycling their large and small unwanted materials for remuneration. Also shown is the operator 20 and a customer 22 utilizing the storefront section 14.

FIG. 2 is a side view of the present invention in use. Shown is a side view of the portable mobile recycling center 10 having a drop deck semi trailer 12 with an enclosed storefront section 14 for office and segregated recyclables storage compartments. An articulated boom 16 attached to the drop deck semi trailer 12 aids in lifting and weighing and depositing recyclables in a removable roll-off container 18 on the rear of the trailer. The boom 16 can be adapted for loading, lifting and dumping a grapple bin 24.

FIG. 3 is a side view of the present invention. Shown is a side view of the portable mobile recycling center 10 with the grapple bin 24 full of recyclables 26 that are being dumped into the roll-off container 18. The boom 16 has lifted and positioned the grapple bin 24 directly over the roll-off container 18.

FIG. 4 is a side view of the present invention. Shown is a side view of the portable mobile recycling center 10 of the present invention with truck detached and the roll-off container 18 removed. The container 18 loads and unloads onto a lift platform 28 which is raised and lowered by a hydraulic piston 30. A winch 32 and cable 34 controls the loading and unloading of the container 18 which travels on wheels 36 disposed on the underside thereof.

FIG. 5 is a side view of the present invention. Shown is a side view of the portable mobile recycling center 10 being a drop deck semi-trailer 12 having an enclosed storage section 14 and a bulk loading section 15. The storage section 14 comprises an office 38, a fresh water tank 40, a bathroom 42, a waste water tank 44, an air/heat vent 48 and a lift-up door 46 which doubles as a canopy when in the open position. The storage section 14 further comprises scales 50, a waste oil collection tank 52, an aluminum can flattener 54, a baler 56, a plurality of storage bins 58 and a generator hydraulic power unit 60. An external remote weight display 62 is provided for the customer's convenience. The bulk loading section 15 comprises an articulated boom arm 16, outriggers 64 for stabilizing the boom arm when in use, a boom scale 66 disposed on the distal end of the boom arm 16, a grapple bin 24 held by a suspension support 70 for loading recyclable material therein and a roll-off container 18 seated on a lift platform 28.

FIG. 6 is a top view of the present invention. Shown is a top view of the portable mobile recycling center 10. Shown is the enclosed storefront section 14 with a small office 38, bathroom 42, scales 30, lift-up door 46, paper shredder 68, aluminum can flattener 54, cardboard baler 56, storage bins 58 and generator hydraulic power unit 60. The bulk loading section 15 is shown with the articulated boom arm 16 supported by a pair of deployed opposing outriggers 64, a boom scale 66 is disposed at the distal end of the articulated boom arm 16 with the grapple bin 24 disposed over the roll-off container 18. The store front provides housing for valuation of recyclables for remuneration.

FIG. 7 is a side view of the present invention. Shown is a side view of the portable mobile recycling center 10 with the operator 20 and customer 22 using the boom scale 66 to weigh the recyclables 26 in the grapple bin 24. The weight is digitally displayed on the remote weight display 62 for customer 22 and operator 20 to view.

FIG. 8 is a side view of the present invention. Shown is a side view of the portable mobile recycling center 10 with a junk vehicle 72 suspended from the articulated boom arm 16 with the weight being recorded by the boom scale 66 and displayed for viewing by the remote weight display 62.

FIG. 9 is a side view of the present invention. Shown is a side view of the portable mobile recycling center 10 with the articulated boom arm 16 lowering a junk vehicle 72 into the roll-off container 18.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A portable, mobile recycling center comprising:
   a) an enclosed storefront section mounted on a forward portion of a mobile frame comprising:
      i) a small office located in a rearward portion of said storefront section;
      ii) a bathroom;
      iii) a fresh water tank for supplying water to said bathroom;
      iv) a waste water tank for storing fluid retrieved from said bathroom;
      v) at least one scale for weighing recyclable material with a weight display directly under said scale within said storefront section and an external remote display located outside of said storefront section;
      vi) a lift up door to provide access through an opening to an interior of said storefront section, said scale for weighing recyclable material being located at a floor level behind said lift up door whereby said scale for weighing recyclable material is directly accessible at waist level to a user approaching said storefront section, said lift up door forming, when in an open position, a canopy over an area immediately in front of said opening into said storefront section behind said lift up door, whereby said floor level within said storefront section forms a counter for said user to approach said opening and access said scale;
      vii) a plurality of recyclable processing mechanisms; and
      viii) a power unit adjacent a front wall of said storefront section;
   b) said frame extending rearwardly from and beyond said storefront section and supported by wheels, a front end of said frame having a structure to allow said frame to be towed; and
   c) a bulk section on a rear portion of said frame above said wheels comprising;
      i) an articulated boom arm;
      ii) a roll-off container large enough to contain an automobile, said boom arm supported by a mounting structure being mounted on said frame between said roll-off container and said storefront section; and
      iii) a lift platform rearwardly of said boom arm mounting structure for supporting, loading and unloading said roll-off container;
      iv) said lift platform being pivoted at a rear edge of said rear portion of said frame;
      v) a hydraulic piston for raising a front end of said lift platform;
      vi) a winch mounted on said front end of said lift platform;
      vii) a cable running from said winch to one end of said roll-off container for pulling said roll-off container onto said lift platform; and
      viii) outriggers extending from said mounting structure for stabilizing said boom arm when in use.

2. The portable, mobile recycling center according to claim 1, wherein said enclosed storefront section further comprises an air vent to provide ventilation therein.

3. The portable, mobile recycling center according to claim 2, wherein said plurality of recycling processing mechanisms includes an aluminum can shredder.

4. The portable, mobile recycling center according to claim 3, wherein said plurality of recycling processing mechanisms further includes a paper shredder.

5. The portable, mobile recycling center according to claim 4, wherein said plurality of recycling processing mechanisms further includes a cardboard baler.

6. The portable, mobile recycling center according to claim 5, wherein said enclosed storefront section has a plurality of storage bins.

7. The portable, mobile recycling center according to claim 6, wherein said enclosed storefront section further comprises a waste oil collection tank.

8. The portable, mobile recycling center according to claim 7, wherein another scale is disposed at a distal end of said articulated boom arm for weighing a recyclable item or items being loaded.

9. The portable, mobile recycling center according to claim 8, wherein a grapple bin hangs from the distal end of said articulated boom arm for loading, weighing and unloading a plurality of recyclable materials.

* * * * *